UNITED STATES PATENT OFFICE.

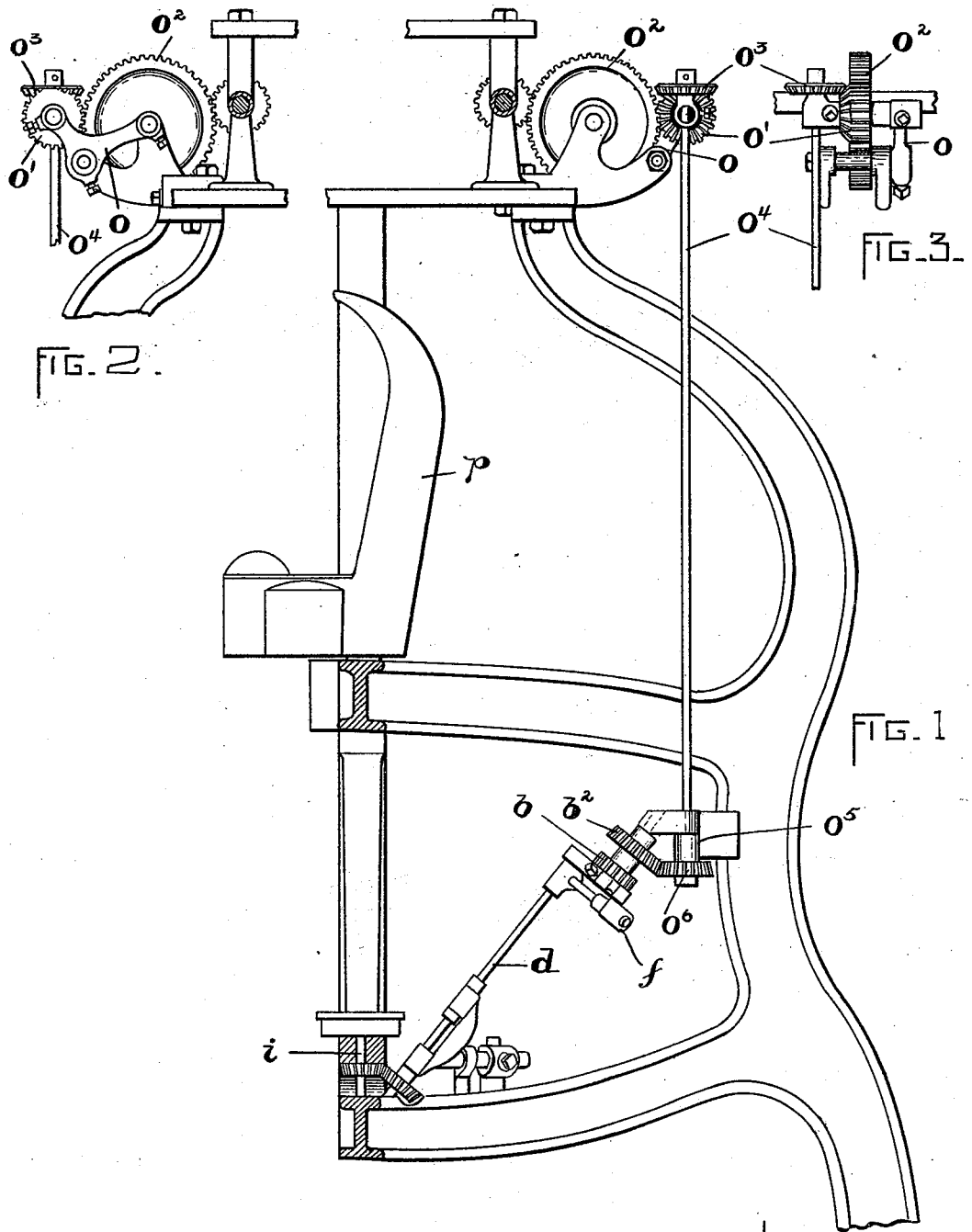

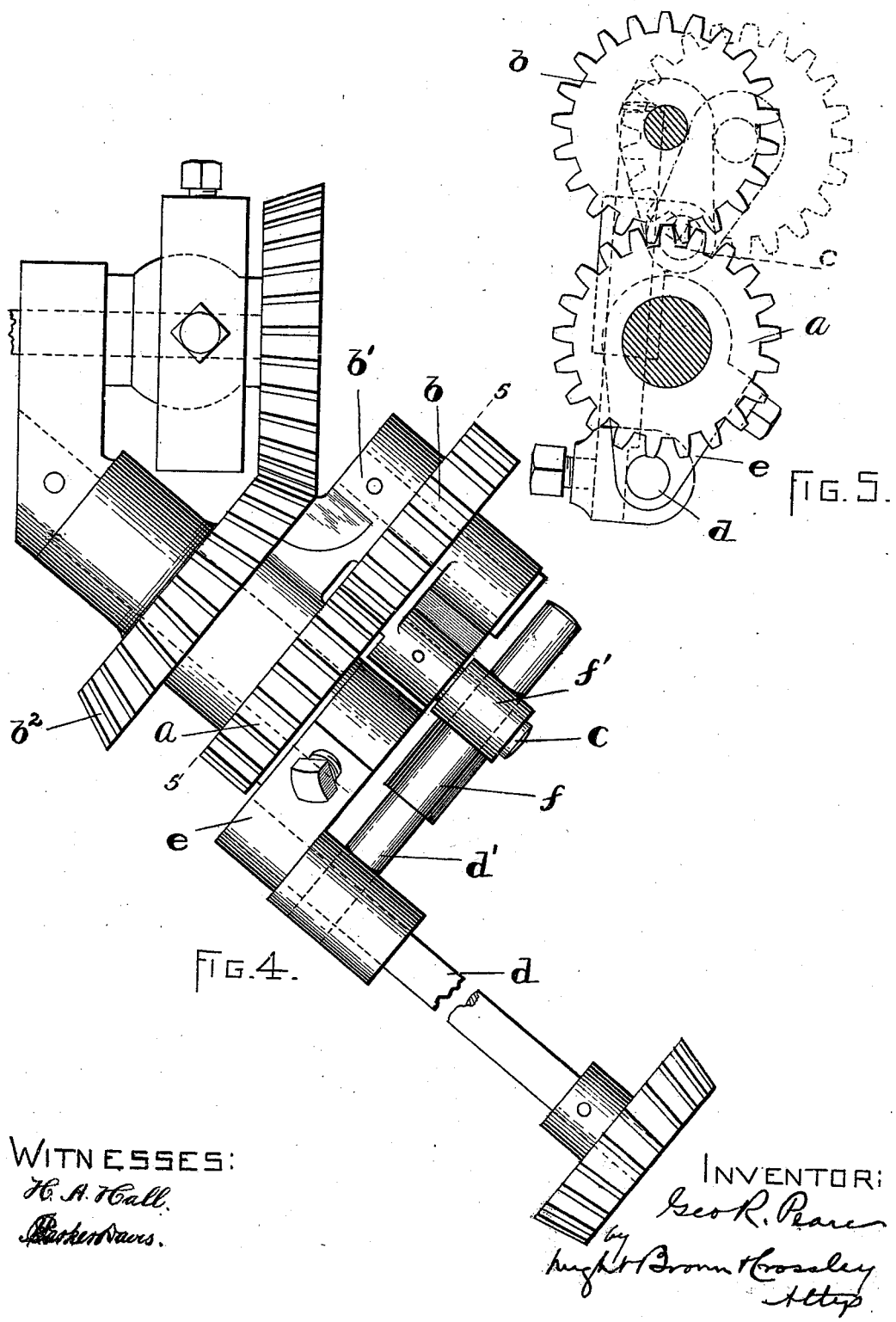

GEORGE R. PEARE, OF LYNN, ASSIGNOR TO THE STEAM HEATED HORN COMPANY, OF BOSTON, MASSACHUSETTS.

MECHANICAL MOVEMENT.

SPECIFICATION forming part of Letters Patent No. 511,357, dated December 26, 1893.

Application filed February 17, 1893. Serial No. 462,798. (No model.)

*To all whom it may concern:*

Be it known that I, GEORGE R. PEARE, of Lynn, in the county of Essex and State of Massachusetts, have invented certain new and useful Improvements in Mechanical Movements, of which the following is a specification.

The object of this invention is to provide an improved mechanical movement whereby an intermittent rotary motion may be produced with a graduating speed before and after the pause. I accomplish this result by the employment of a planet-gear which is eccentrically connected to the rotary part to be driven. There are numerous ways of embodying the invention and I have not here attempted to illustrate all the constructions by which it may be carried out.

In the accompanying drawings three different forms are illustrated.

Figure 6:
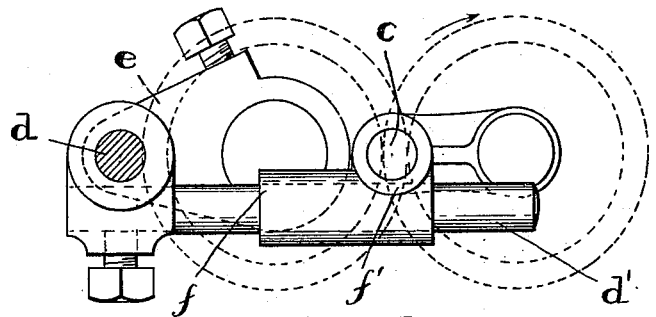
Figure 7:
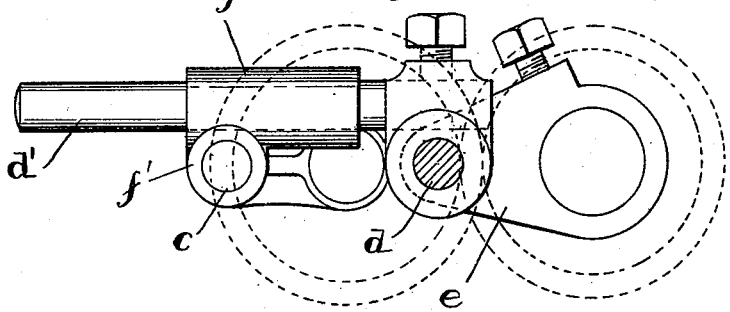
Figure 8:
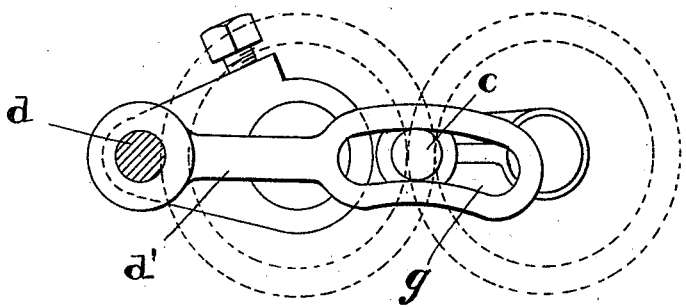
Figure 9:
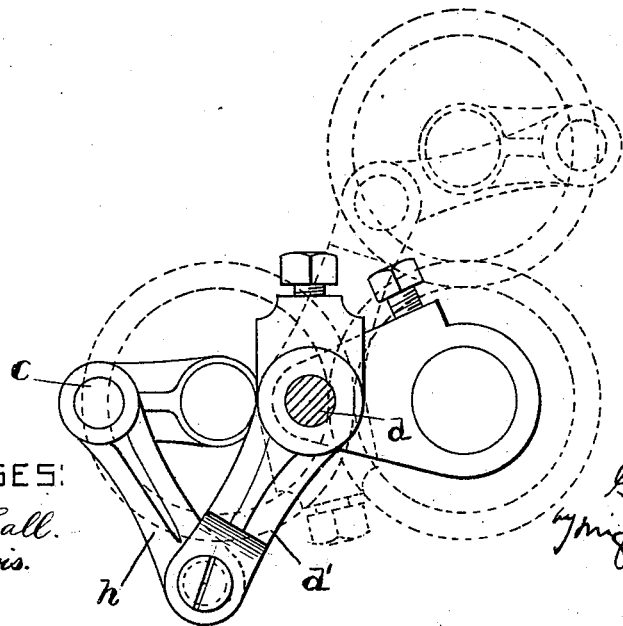

Figure 1 shows the invention applied to a shoe sewing machine of the McKay type, only a portion of the machine being illustrated. Fig. 2 shows an elevation of the opposite side of the upper part of the machine. Fig. 3 shows an edge view of the parts shown in Fig. 2. Fig. 4 shows a side or edge view of the mechanical movement on an enlarged scale. Fig. 5 shows a sectional view taken on line 5 5, of Fig. 4. Fig. 6 shows an end view with the driven shaft in section, and the parts as they appear when said shaft is at a standstill. Fig. 7 shows a similar view with the parts as they appear when the driven shaft moves at the highest speed. Fig. 8 shows a similar view to Fig. 6 of a modification, and Fig. 9 shows a similar view of another modification.

The mechanical movement comprises a stationary gear $a$, and a planet-gear $b$, of the same number of teeth as and meshing with the stationary gear. This planet-gear may be arranged in any suitable manner so as to be rotated around the stationary gear. In the present instance it is carried by a crank-arm $b'$ fast with a bevel-gear $b^2$ to which motion may be transmitted in any suitable manner. The planet-gear has a crank-pin $c$ whose center is coincident with the pitch line of the gear as illustrated by broken lines in Fig. 5. A shaft $d$ which is to be driven by the movement, has one end journaled in an arm $e$ fast with the stationary gear $a$, the bearing for said shaft being eccentrically located with respect to the center of said stationary gear. Said shaft $d$ has a crank-arm $d'$ and a sleeve $f$ is fitted so as to slide on said arm and is formed with a bearing $f'$ which receives the crank-pin $c$ of the planet-gear.

Motion being transmitted to the planet wheel, it will rotate around the stationary gear and at the same time will rotate on its own axis. When the crank-pin $c$ is coincident with the coinciding pitch lines of the two gears $a$ and $b$, as illustrated in the drawings, the planet-gear may move from the position shown in full lines in Fig. 5, to that shown in broken lines in said figure, while its crank-pin is turning in its bearing on the sleeve $f$, and consequently during this time, the shaft $d$ is at a standstill. As the planet-gear continues around the stationary gear, the crank-pin $c$ moves around in the direction indicated by the arrow in Fig. 6, and motion is transmitted to the shaft $d$ with gradually increasing speed, the sleeve $f$ moving outward on the crank-arm $d'$. The shaft $d$ is journaled to one side of the center of the stationary gear $a$, so that when the planet-gear arrives at this journal-point, as shown in Fig. 7, the crank-pin $c$ will be at its farthest outward position. Consequently at this point the shaft $d$ has reached its maximum speed. As the planet-gear continues, the speed of the driven shaft gradually decreases as the crank-pin travels inward, and ceases as said pin arrives at a point coincident with the coinciding pitch lines of the two gears.

By journaling the shaft off the center of the stationary gear, a higher maximum speed of the shaft is possible than if the center of rotation of said shaft were coincident with the center of the stationary gear.

The extensible connection between the crank-pin of the planet-gear and the driven shaft may be effected by other means than the sliding sleeve on the crank-arm of said shaft. In Fig. 8, the crank-arm $d$ is formed with an arc-shaped slot $g$, which receives the crank-pin $c$. With this construction, the curvature of the slot permits a longer stop of the driven-shaft, for the crank-pin may move through a greater arc without affecting the crank-arm of the driven-shaft. Fig. 9 shows a different construction for effecting this extensible connection in which the crank-arm of the driven-shaft is connected with the crank-pin of the planet-gear by a link $h$, pivoted on said crank-pin at one end and jointed to the crank-arm at the other end. This forms a toggle-connection between the shaft and the crank-pin of the planet-gear, which permits a gradual extension of the connection and a graduating speed of the driven-shaft in starting and stopping.

This mechanical movement is of great advantage in shoe sewing machines for driving the whirl in the horn as it not only supplies an intermittent rotary motion but also a graduation of speed before and after the pause.

Figs. 1, 2 and 3 show a manner of applying the movement to a sewing machine of the McKay type. The shaft $d$ is geared to the whirl-spindle $i$, which connects with the whirl through the horn $p$, and the bevel-gear $b^2$ is connected with the source of power so as to receive a continuous rotary motion.

A convenient arrangement for connecting the bevel gear $b^2$, with the driving gear of the machine is illustrated in the drawings. A bracket, $o$, is fastened to the frame of the machine and has a bearing for a gear, $o'$, meshing with a gear $o^2$, of the machine and also meshing with a bevel gear, $o^3$, on the upper end of a shaft or spindle, $o^4$, whose lower end is supported in a bearing, $o^5$, clamped to the frame of the machine and carries a bevel gear, $o^6$, meshing with the bevel gear, $b^2$.

It is evident that the movement may be utilized in a large variety of machines.

It is to be understood that I do not limit myself to any specified construction for carrying out the invention, as it may be embodied in numerous forms.

Having thus explained the nature of the invention and described a way of constructing and using the same, though without attempting to set forth all of the forms in which it may be made or all the modes of its use, it is declared that what is claimed is—

1. A mechanical movement comprising a stationary gear; a planet-gear in mesh therewith, and having a crank-pin whose center is coincident with the pitch-line of the said planet-gear; and a rotary driven part suitably connected with the crank-pin of the planet-gear, and whose center of rotation is outside of the center of the stationary gear and included within the line of travel of the said crank-pin.

2. A mechanical movement comprising a stationary gear; a planet-gear in mesh therewith, and having a crank-pin whose center is coincident with the pitch-line of the said planet-gear; a rotary driven part having a crank-arm, and a sleeve movable longitudinally on said crank-arm and having a bearing which receives the crank-pin on the planet-gear.

In testimony whereof I have signed my name to this specification, in the presence of two subscribing witnesses, this 23d day of January, A. D. 1893.

GEO. R. PEARE.

Witnesses:
A. D. HARRISON,
F. PARKER DAVIS.